United States Patent [19]

Jenkins et al.

[11] Patent Number: 4,943,231
[45] Date of Patent: Jul. 24, 1990

[54] REGENERATIVE BURNER SYSTEM

[75] Inventors: David P. Jenkins, Crynant; James T. Edmundson, Seansea, both of United Kingdom

[73] Assignee: British Steel plc, London, England

[21] Appl. No.: 283,389

[22] Filed: Dec. 12, 1988

[30] Foreign Application Priority Data

Dec. 24, 1987 [GB] United Kingdom ............... 8730171

[51] Int. Cl.⁵ .............................................. F23D 11/44
[52] U.S. Cl. ........................................ 431/215; 431/5; 431/161; 432/180; 432/181; 432/182
[58] Field of Search ..................... 432/180, 181, 182; 431/215, 216, 181, 162, 164, 5; 126/91 A; 422/141, 175, 206

[56] References Cited

U.S. PATENT DOCUMENTS

| | | | |
|---|---|---|---|
| 546,375 | 9/1895 | Barlow | 432/182 |
| 1,700,398 | 1/1929 | Boczek | 432/182 |
| 1,769,854 | 7/1930 | Orth | 432/182 |
| 2,785,212 | 3/1957 | Begley | 432/180 X |
| 3,051,462 | 8/1962 | Fennell | 432/182 X |
| 3,870,474 | 3/1975 | Houston | 432/181 X |
| 4,358,268 | 11/1982 | Neville | 431/215 X |
| 4,650,414 | 3/1987 | Grenfell | 431/5 |
| 4,730,599 | 3/1988 | Kendall et al. | 126/91 A |
| 4,768,949 | 9/1988 | Goodfellow | 432/181 X |
| 4,793,974 | 12/1988 | Hebrank | 431/5 |
| 4,807,695 | 2/1989 | Ward | 432/181 X |

FOREIGN PATENT DOCUMENTS 599846 3/1948 United Kingdom ............... 432/182
2128724B 11/1985 United Kingdom .

*Primary Examiner*—Carl D. Price
*Attorney, Agent, or Firm*—Bacon & Thomas

[57] ABSTRACT

A regenerative burner system comprises two burners alternately fired and each having an air and fuel supply thereto traversing separate heat exchangers. The arrangement is such that the hot gases exhausted from the furnace during firing of the one and the other burners traverse the heat exchangers associated with the other and the one burners, respectively, relinquishing heat thereto whereby both the fuel and the air supply to each burner extracts heat from its associated heat exchanger during the firing cycle of that burner. By heating both the fuel and the air input to the regenerative system, fuels of low calorific value, e.g. blast furnace gas or any gases low in or devoid of hydrocarbons may be efficiently utilized to provide a stable high temperature flame without the need for enrichment with 'pilot' fuels.

6 Claims, 1 Drawing Sheet

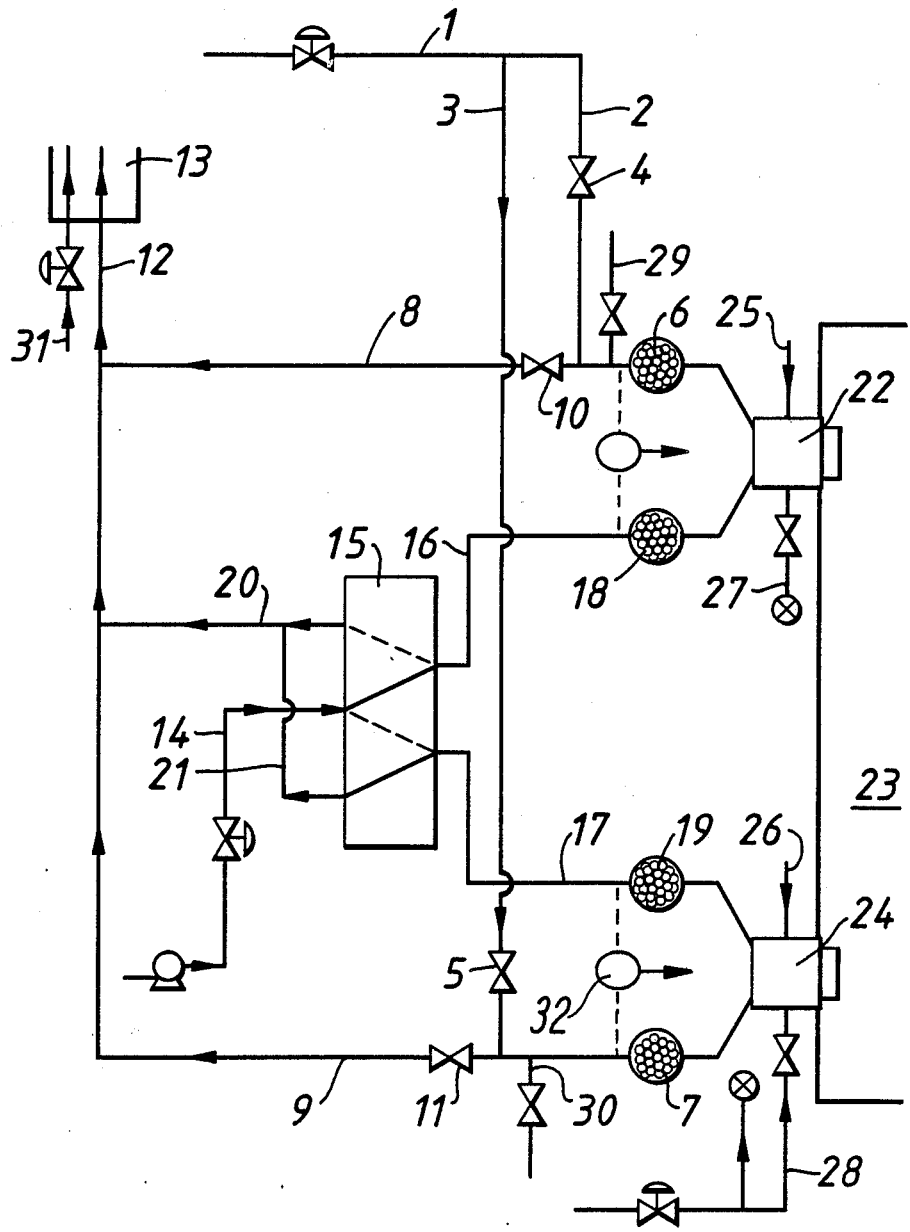

REGENERATIVE BURNER SYSTEM

This invention relates to a regenerative burner system, that is, a cyclically operative arrangement whereby each of two burners which fire alternately is associated with a heat exchanger, heat being relinquished to that exchanger associated with the quiescent burner by hot gases exhausted from the furnace whilst the active burner is firing, and heat being extracted from the exchanger associated with the active burner by the supply thereto such that it is pre-heated before application to that burner.

Hitherto, this has been effected in respect of the air supply to a regenerative burner system, e.g. as disclosed in U.K. Patent No. 2128724, realising significant improvements in efficiency.

It is an object of this invention to provide an improved regenerative burner system.

From one aspect, the invention provides a regenerative burner system comprising two burners alternately fired and each having an air and fuel supply thereto traversing separate heat exchangers, the arrangement being such that the hot gases exhausted from the furnace during firing of the one and the other burners traverse the heat exchangers associated with the other and the one burners, respectively, relinquishing heat thereto whereby both the fuel and the air supply to each burner extracts heat from its associated heat exchanger during the firing cycle of that burner.

The hot gases may conveniently be exhausted through the 'quiescent' burner; the fuel may be a gas and any residual fuel in the supply lines, including the heat exchanger, to the firing burner as it is extinguished may be purged through said burner by an inert gas, or indeed by the waste gas, during an interval between the extinguishing of one burner and the firing of the other, whereby to avoid said residual fuel being exhausted with the hot furnace gases. Each heat exchanger may comprise packed balls of e.g zirconia, alumina or other refractory/ceramic housed in a casing.

The furnace burners will in practice be arranged in multiples of two, e.g. four, six, eight etc appropriately balanced.

In accordance with this invention, by heating both the fuel and the air input to the regenerative system, fuels of low calorific value, e.g. blast furnace gas as low as 65 BThU per cu. ft., or any gases low in or devoid of hydrocarbons may be efficiently utilised to provide a stable high temperature flame without the need for enrichment with 'pilot' fuels. Thus, blast furnace gas which is, with current blast furnace practice, very low in quality, can now readily be used as a direct replacement of high grade fuels such as natural gas and oil, in say steel production, e.g. in reheating or annealing processes. The generation of electricity on site, where hitherto blast furnace gas has been used in boiler plant, may now be much reduced—the upgrading of the use to which the blast furnace gas may now be put rendering it more economical to purchase electricity.

In order that the invention may be fully understood, one embodiment thereof will now be described, by way of example, with reference to the accompanying drawing which schematically illustrates the 'double' regenerative burner system.

Blast furnace gas is introduced along duct 1, which splits into two 2,3 and is fed via valves 4,5 to heat exchangers 6,7 respectively. These comprise heat storage 'beds' of packed alumina balls. Likewise, exhaust or flue ducts 8,9 extend via valves 10,11 from these heat exchangers to a common stack 12 in which an eductor 13 is sited.

Air is introduced along duct 14 through a change-over valve 15 to ducts 16 or 17 coupled to heat exchangers 18 and 19, respectively. Exhaust or flue ducts 20,21 are coupled to the stack 12, the duct employed being dependent on the position of the change-over valve.

The heat exchangers 6 and 18 are coupled in common to one burner (22) sited in the wall of furnace 23 whilst the other burner (24) has coupled to it the heat exchangers 7 and 19.

Fuel for 'pilot' ignition purposes is supplied via 25 and 26; a 'standby' rich fuel source is provided via 27,28 through isolating valves. Lines 29,30 provide for a purge of nitrogen gas and finally an air source 31 is coupled to the eductor to drive same.

In operation first assume burner 22 to be firing. Air is injected, via duct 16 and heat exchanger 18, with the change-over spool valve in the position shown, and the fuel (blast furnace gas) is injected via duct 2 and heat exchanger 6 - valve 4 being open. During this cycle valves 5 and 10 are closed and valve 11 is open. Combustion products from the furnace are exhausted through the quiescent burner 24 via the heat exchangers 7 and 19 through ducts 9 (valve 11 being open) and 17/21, these flue gases being exhausted to the stack at a relatively low temperature, e.g. 100° C. to 200° C.

After a pre-set time interval, or when the waste gas temperature on the downstream side of the heat exchangers 7 and 19 exceeds a certain level temperature sensor (or timer) 32 operates to ensure that, the air and fuel supply to the burner 22 are shut-off by closing valve 4 and initiating a change-over in valve 15 to the position shown in the dotted lines. A nitrogen purge is effected via 29 such that any gas residing in the heat exchanger is momentarily ignited in the burner 22. This ensures that unburnt blast furnace gas is not exhausted to the stack.

Valve 5 is opened and valve 11 is closed such that with an air and fuel supply to burner 24 the latter fires. Both the air and the fuel is preheated during its passage through the heat exchangers 7 and 19, the heat storage bed of balls having been heated by the flue gases exhausted through this medium during the previous cycle. The flue gases are now exhausted through burner 22, heating the alumina balls in 6 and 18, passing to the stack via valve 10 (now open) on the one hand and via ducts 16 and 20 on the other.

At the completion of this firing cycle, again determined by the same criteria as mentioned above, burner 24 is shut off by closing valve 5 and initiating another change-over in valve 15, the nitrogen purge of unburnt blast furnace gas in heat exchanger 7 again being affected but this time via line 30. The cycle is then repeated.

Although this system has been described with reference to the particular embodiment illustrated, it is to be understood that various changes may readily be made without departing from the scope of this invention. For example other control configurations could readily be presented consistent with the 'double' regenerative burner concept. Moreover, the nitrogen purge is only adopted since an air driven eductor is shown. An eductor is not essential; the waste gases may be sucked out by a fan sited in the stack 12. In that event the waste gases themselves may be used to purge the residual fuel by introducing a gas line between the downsteam side of the fan and 29, 30.

Further, the form of burner employed is not a critical factor but an axial gas flow type with a tangential air inlet to create swirl, and thus good mixing, has been found to be most satisfactory with an intermediate flame retention or retarding ring essentially delimiting a primary chamber—into which the fuel and air are injected—and a secondary downstream chamber where the pilot ignition is effected.

We claim:

1. A regenerative burner system for a furnace comprising at least two burners alternatively fired and each having an air and gaseous fuel supply thereto traversing separate heat exchangers, the burners and heat exchangers being arranged such that the hot gases are exhausted from the furnace through the quiescent burner during firing of one burner, traverse the heat exchangers associated with the quiescent burner, relinquishing heat thereto during the firing cycle of the burner, wherein said gaseous fuel supply supplies gaseous fuel of low calorific value, essentially devoid of hydrocarbons, wherein alternating the firing by extinguishing one burner and firing the other burner is effected in dependence on the temperature of the gases exhausted through the heat exchanger associated with the quiescent burner immediately before such alternation and wherein any residual fuel in the supply lines and heat exchangers associated with the firing burner are purged through means for purging that burner by an inert gas supplied form a source of inert gas as it is extinguished.

2. A system according to of claim 1, in which each heat exchanger comprises packed balls of a ceramic material housed in a casing.

3. A system according to claim 2, in which the burners in said system are arranged in multiples of two.

4. A system according to claim 1, wherein said gaseous fuel is blast furnace gas.

5. A regenerative burner system for a furnace comprising at least two burners alternately fired and each having an air and a gaseous fuel supply thereto traversing separate heat exchangers consisting of packed balls of refractory material housed in a casing, the burners being arranged such that the hot gases exhausted from the furnace during firing of one burner traverse the heat exchangers associated with the other burner relinquishing heat thereto, the hot gases being exhausted through the quiescent burner, wherein the gaseous fuel is a fuel of low calorific value, essentially devoid of hydrocarbons, wherein alternating the firing by extinguishing one burner and firing the other is effected in dependence on the temperature of the gases exhausted through the heat exchanger associated with the quiescent burner immediately before such alternation and wherein any residual fuel in the supply lines and heat exchangers associated with the firing burner are purged through means for purging that burner by an inert gas supplied form a source of inert gas as it is extinguished.

6. A system according to claim 5, wherein said gaseous fuel is blast furnace gas.

* * * * *